(12) United States Patent
Qu

(10) Patent No.: US 7,987,013 B2  
(45) Date of Patent: Jul. 26, 2011

(54) ESTIMATING YIELD FLUCTUATION FOR BACK-END PLANNING

(75) Inventor: Peng Qu, Austin, TX (US)

(73) Assignee: GLOBALFOUNDRIES Inc., Grand Cayman (KY)

(*) Notice: Subject to any disclaimer, the term of this patent is extended or adjusted under 35 U.S.C. 154(b) by 1089 days.

(21) Appl. No.: 11/756,993

(22) Filed: Jun. 1, 2007

(65) Prior Publication Data

US 2008/0299683 A1   Dec. 4, 2008

(51) Int. Cl.
*G06F 19/00*   (2006.01)
(52) U.S. Cl. .................................... 700/99; 700/110
(58) Field of Classification Search .............. 700/99, 700/100, 101, 102, 108, 109, 110; 705/8
See application file for complete search history.

(56) References Cited

U.S. PATENT DOCUMENTS

| | | | |
|---|---|---|---|
| 7,218,980 B1 * | 5/2007 | Orshansky et al. | 700/99 |
| 7,242,994 B2 * | 7/2007 | Ishibashi et al. | 700/100 |
| 2004/0128177 A1 * | 7/2004 | Wei | 705/8 |
| 2005/0278048 A1 * | 12/2005 | Chiu et al. | 700/99 |

* cited by examiner

*Primary Examiner* — Ryan A Jarrett
(74) *Attorney, Agent, or Firm* — Williams, Morgan & Amerson, P.C.

(57) ABSTRACT

A method for production planning includes receiving a first order quantity of a first device. A first yield estimate of the first device from a production line is determined. The first yield estimate is adjusted based on a first confidence factor associated with the first order quantity. A dispatch quantity for processing in the production line is determined based on the first order quantity and the adjusted first yield estimate.

21 Claims, 3 Drawing Sheets

ESTIMATING YIELD FLUCTUATION FOR BACK-END PLANNING

CROSS-REFERENCE TO RELATED APPLICATIONS

Not applicable.

BACKGROUND OF THE INVENTION

The present invention relates generally to manufacturing and, more particularly, to a method and apparatus for estimating yield fluctuation for back-end planning.

There is a constant drive within the semiconductor industry to increase the quality, reliability and throughput of integrated circuit devices, e.g., microprocessors, memory devices, and the like. This drive is fueled by consumer demands for higher quality computers and electronic devices that operate more reliably. These demands have resulted in a continual improvement in the manufacture of semiconductor devices, e.g., transistors, as well as in the manufacture of integrated circuit devices incorporating such transistors. Additionally, reducing the defects in the manufacture of the components of a typical transistor also lowers the overall cost per transistor as well as the cost of integrated circuit devices incorporating such transistors.

Generally, a set of processing steps is performed on a wafer using a variety of processing tools, including photolithography steppers, etch tools, deposition tools, polishing tools, rapid thermal processing tools, implantation tools, etc. During the fabrication process various events may take place that affect the performance of the devices being fabricated. That is, variations in the fabrication process steps result in device performance variations. Factors, such as feature critical dimensions, doping levels, contact resistance, particle contamination, etc., all may potentially affect the end performance of the device.

After fabrication of the devices is complete, each wafer is subjected to preliminary functional tests. Wafers that pass these tests are then cut to singulate the individual die, which are then packed in substrates. Packed dies are then subjected to additional tests against the specification of customers' orders to determine performance characteristics such as maximum operating speed, power, caches, etc.

Exemplary tests include initial class tests (ICL) that is a preliminary test for power and speed. ICL testing is usually followed by burn-in (BI) and post burn-in (PBI) tests that test packaged die under specified temperature and/or voltage stress, and automatic test equipment (ATE) tests that test die functionality. Then, packaged dies with different characteristics go through system-level tests (SLT) in which they are tested against customer requirements on specific electrical characteristics. In SLT, packaged dies are tested in an actual motherboard by running system-level tests (e.g., variance test programs). After completion of the testing, the devices are fused, marked, and packed to fill customer orders. This back-end processing is commonly referred to as the test, mark, pack (TMP) process.

Based on the results of the performance tests each device is assigned a grade, which effectively determines its market value. In general, the higher a device is graded, the more valuable the device. However, some applications do not require high-end devices. Accordingly, maximizing the profitability of the fabrication facility does not necessarily equate to maximizing the output of high-grade devices.

Because of the variation in performance of the end product devices, it is difficult to predict the throughput of the TMP line for devices meeting the requirement for a particular order part number (OPN). An OPN is associated with various parameters, such as speed and test requirements, that die must meet, which can be highly different for dies on the same wafer due to variance in process control during wafer fabrication. Hence, the supply of completed devices may not always result in desired number of outputs for a qualified OPN. For example, if a large number of high performing devices (i.e., more expensive devices) have been produced, but the current demand is for lower cost devices (i.e., slower), orders may not be able to be filled with the desired grade device. As a result, the manufacturer may be forced to sell devices of a higher grade at a lower price to fill the order. If the demand is for higher grade devices, and the supply of higher grade devices is diminished, the manufacturer may be unable to fill the order at all. Either situation results in lost profits for the manufacturer.

New product revisions typically have low yields and high yield variances over the test, mark, and pack (TMP) process. This fluctuation may result from design defects or narrow yield control limits. Also, new test process flows or new test programs typically result in increases in yield fluctuations. The testing process assigns devices to bins in accordance with their performance characteristics. Because TMP is the last process before finished packages are shipped to customers, the ability to accurately estimate the yield fluctuation during production planning and control is an important aspect of ensuring that commitments to customers may be met. Typically, fabrication personnel manually estimate the number of devices to dispatch into the TMP process to achieve output levels of a particular OPN sufficient to fill customer orders. This manual process relies heavily on planner experience and preferences. For example, different planners may add different buffers of additional devices to attempt to compensate for yield fluctuation. However, as the yield and yield fluctuation vary over time, such as with the product lifecycle, this approach may not reliably ensure that enough devices are available. Inconsistencies in yield prediction and buffering techniques impacts production inventories and production waste, reducing the overall efficiency of the production line. When more devices are completed than are needed to fill customer orders, the extra devices are stored in inventory for future demands, which results in week-to-week inventory costs. Overproduction also negatively impacts equipment capacity as equipment resources are consumed unnecessarily. If customer demand is not met, the unfinished portion rolls over to the following week, which increases production pressure for the following week and reduces customer satisfaction.

This section of this document is intended to introduce various aspects of art that may be related to various aspects of the present invention described and/or claimed below. This section provides background information to facilitate a better understanding of the various aspects of the present invention. It should be understood that the statements in this section of this document are to be read in this light, and not as admissions of prior art. The present invention is directed to overcoming, or at least reducing the effects of, one or more of the problems set forth above.

BRIEF SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

One aspect of the present invention is seen in a method for production planning. The method includes receiving a first order quantity of a first device. A first yield estimate of the first device from a production line is determined. The first yield estimate is adjusted based on a first confidence factor associated with the first order quantity. A dispatch quantity for processing in the production line is determined based on the first order quantity and the adjusted first yield estimate.

Another aspect of the present invention is seen in a system including a production line operable to produce devices and a yield monitor. The yield monitor is operable to receive a first order quantity of a first device, determine a first yield estimate of the first device from the production line, adjust the first yield estimate based on a first confidence factor associated with the first order quantity, and determine a dispatch quantity for processing in the production line based on the first order quantity and the adjusted first yield estimate.

BRIEF DESCRIPTION OF THE SEVERAL VIEWS OF THE DRAWINGS

The invention will hereafter be described with reference to the accompanying drawings, wherein like reference numerals denote like elements, and.

Figure 1:
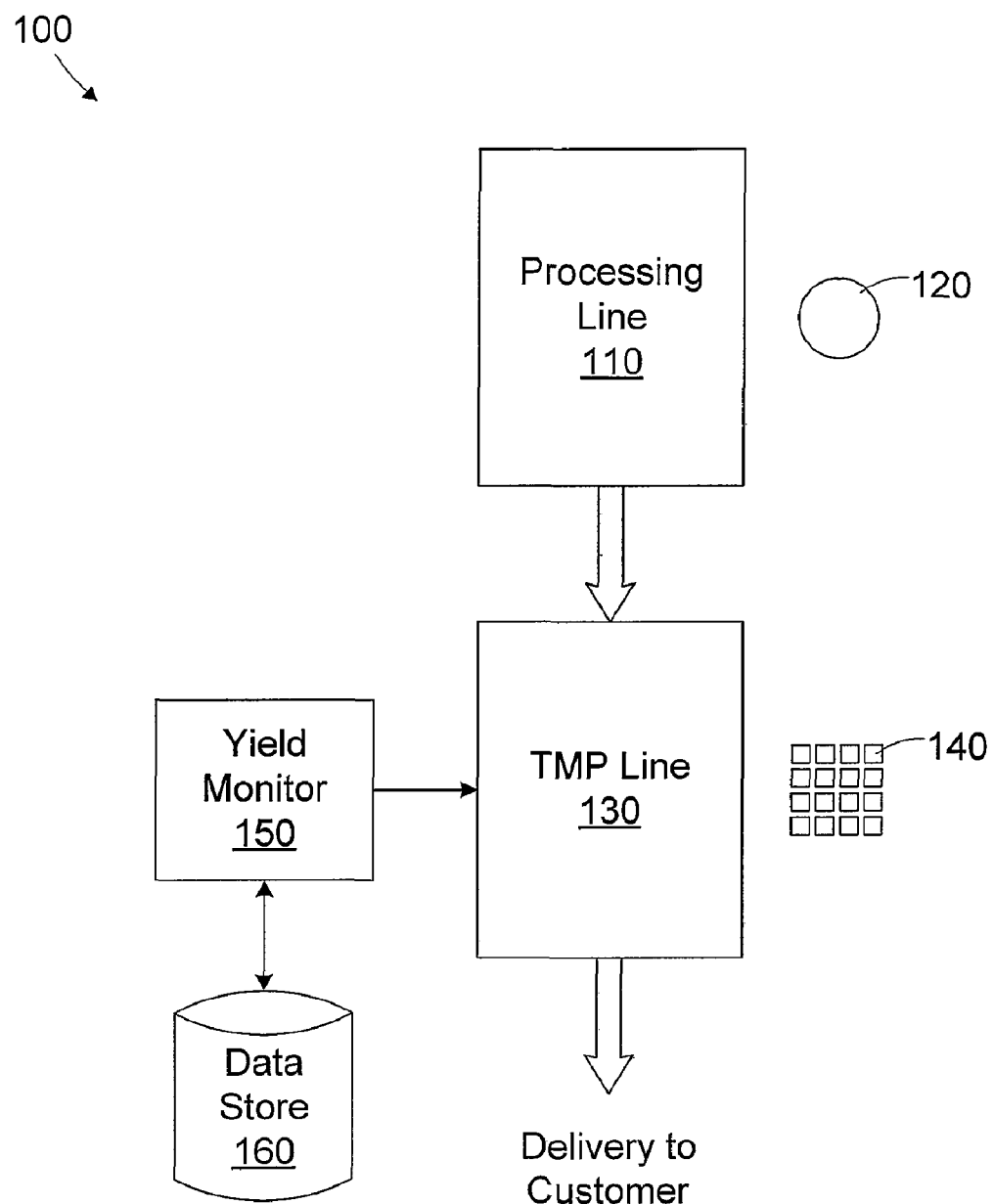
FIG. 1 is a simplified block diagram of a manufacturing system in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

One or more specific embodiments of the present invention will be described below. It is specifically intended that the present invention not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "accessing" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices. Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

Referring now to the drawings wherein like reference numbers correspond to similar components throughout the several views and, specifically, referring to FIG. 1, the present invention shall be described in the context of an illustrative manufacturing system 100. The manufacturing system 100 includes a processing line 110 for fabricating wafers 120, a test, mark, pack (TMP) line 130 for processing devices 140, a yield monitor 150, and a data store 160. In the illustrated embodiment, wafers 120 are processed by the processing line 110 to fabricate die thereon. The processing line 110 may include a variety of process tools and/or metrology tools, which may be used to process and/or examine the wafers to fabricate the semiconductor devices. For example, the process tools may include photolithography steppers, etch tools, deposition tools, polishing tools, rapid thermal anneal tools, ion implantation tools, and the like. The process metrology tools may include thickness measurement tools, scatterometers, ellipsometers, scanning electron microscopes, and the like. Techniques for processing the wafers 120 are well known to persons of ordinary skill in the art and therefore will not be discussed in detail herein for clarity and to avoid obscuring the present invention. Although a single wafer 120 is pictured in FIG. 1, it is to be understood that the wafer 120 is representative of a single wafer as well as a group of wafers, e.g. all or a portion of a wafer lot that may be processed in the processing line 110.

After the wafers 120 have been processed in the processing line 110 to fabricate the die, certain metrology tools, such as sort or final wafer electrical test (FWET) tools may be employed to collect electrical performance data while the wafer is still uncut. Sort metrology employs a series of probes to electrically contact pads on the completed die to perform electrical and functional tests. For example, a sort metrology tool may measure voltages and/or currents between various nodes and circuits that are formed on the wafer 120. Exemplary sort parameters measured include, but are not limited to, clock search parameters, diode characteristics, scan logic voltage, static IDD, VDD min, power supply open short characteristics, and ring oscillator frequency, etc. The particular sort parameters selected may vary depending on the application and the nature of the device formed on the die. Final wafer electrical testing (FWET) entails parametric testing of discrete structures like transistors, capacitors, resistors, interconnects and relatively small and simple circuits, such as ring oscillators. It is intended to provide a quick indication as to whether or not the wafer is within basic manufacturing specification limits. Wafers that exceed these limits are typically discarded so as to not waste subsequent time or resources on them.

After the die on the wafer 120 have completed preliminary testing, the wafers 120 are cut to singulate the die. Each die is then each mounted to a package, resulting in the devices 140. Automated test equipment (ATE) in the TMP line 130 then runs the devices 140 through various testing programs to grade the devices and verify full functionality. Devices 140 may also be subjected to system level tests that verify their operability in a computer system.

The yield monitor 150 monitors the TMP line 130 to track the yields of various devices 140 over time. Historical yield data may be stored in the data store 160. The yield data may originate from the various metrology tools in the TMP line 130, and/or the yield monitor 150 may store yield results in the data store 160. In general, the yield monitor 150 attempts to monitor yield and yield variability to provide production estimates for devices 140 meeting the requirements of customer orders. A production planner provides a required quantity of devices 140 to the yield monitor 150 (e.g., manually or automatically through the generation of an order). The production planer may also specify a confidence factor defining a desired level of certainty that the order quantities will be met. For example, the planner may require that the order may be filled with 90% certainty. The yield monitor 150 uses the yield history to estimate a number of devices 140 that should be dispatched into the TMP line 130 to provide output quantities sufficient to fill the order. In determining the estimated dispatch quantity to meet the desired output quantity, the yield monitor 150 estimates the yield, and subsequently adjusts the yield based on the yield fluctuations and the desired confidence level.

Figure 2:
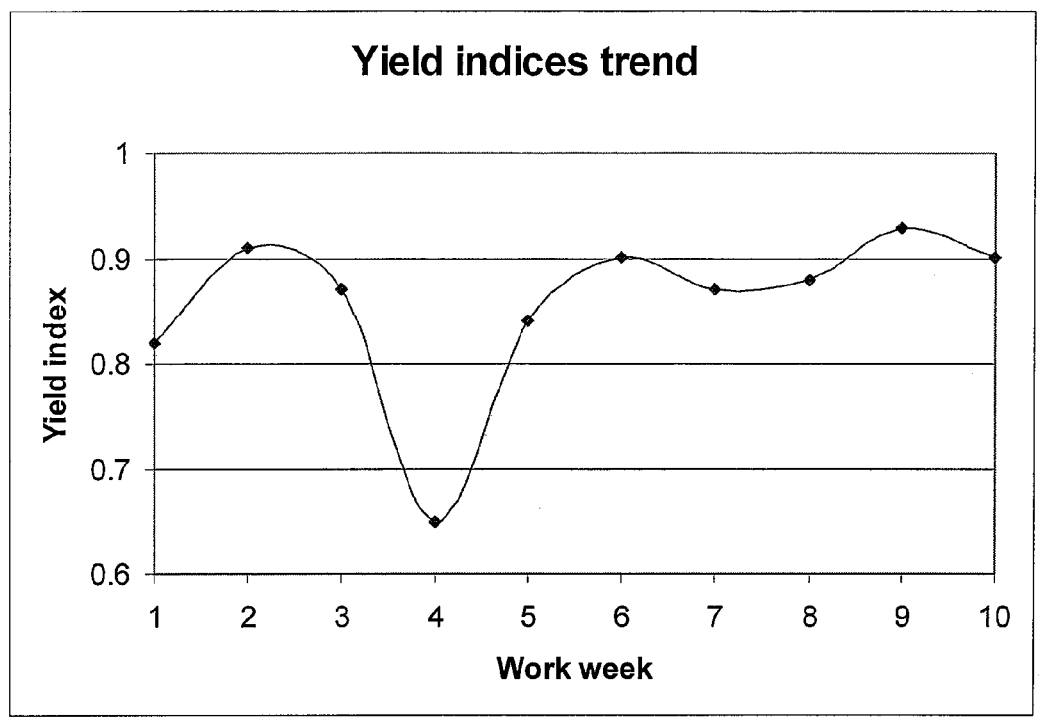
FIG. 2 is a diagram of a yield history associated with the system of FIG. 1.

Turning now to FIG. 2, an exemplary yield curve 200 is illustrated. The yield curve represents the yield of devices associated with a particular order part number (OPN) over time (e.g., 10 weeks in FIG. 2). The yield data represents the devices output by the TMP line 130. Each OPN may be tracked using a different yield history. The yield data represents the percentage of devices that fall into the bin associated with the OPN compared to all the devices processed through the TMP line 130 that could potentially be associated with the OPN (i.e., similar devices). Although the yield data in FIG. 2 is collected on a weekly basis, other time periods, such as number of devices per day or per shift. Using the yield data, the yield monitor 150 generates an average yield statistic. One exemplary technique for generating an average yield statistic involves the use of an exponentially weighted moving average filter.

The general equation for an EWMA filter is:

$$\hat{y}_{k+1} = \frac{\omega_0 y_k + \omega_1 y_{k-1} + \omega_2 y_{k-2} + \cdots + \omega_n y_{k-n}}{\omega_0 + \omega_1 + \omega_2 + \cdots + \omega_n}, \quad (1)$$

where the weighting factor, $\omega_i = (1-\lambda)^i$, discounts older yield measurements, and $\lambda$ is a tuning parameter that affects the level of discounting (i.e., $0 < \lambda < 1$).

The yield monitor 150 uses the EWMA yield estimate to predict the yield for future progress of the TMP line 130. However, the estimated mean is adjusted in light of the presence of yield fluctuations to increase the likelihood that the order may be met. Hence, the yield monitor 150 determines the final dispatch quantity by considering the standard deviation of the samples as well as a desired confidence interval. For example, a production planner may specify that a 90% confidence interval may be used. Hence, based on current yield estimate and yield fluctuation, the yield monitor 150 determines an adjusted yield that the TMP line 130 is 90% likely to meet. Using the adjusted yield estimate, the dispatch quantity that is determined is thus also 90% likely to result in the yield of the desired order quantity by the TMP line 130.

The confidence interval may vary depending on the particular implementation and business characteristics of the order. Orders with a higher cost of failure (e.g., in terms of customer satisfaction or in actual costs to make up the using higher grade devices) may be specified with a higher confidence interval.

The equation for adjusting the yield estimate while considering the confidence interval and standard deviation of the yield history is:

$$\hat{y}' = \hat{y} - t_{\alpha,n} s / \sqrt{n},$$

where $\hat{y}$ is the EWMA yield estimate, s is the standard deviation of the yield sample, n is the number of yield data points used in the generation of the yield estimate, and $t_{\alpha,n}$ is the t-statistic. Hence, if the confidence interval is 90%, it is 90% likely that the TMP line 130 will have an average yield of at least $\hat{y}'$.

The yield monitor 150 determines a dispatch quantity using the equation:

$$DQ = OQ/\hat{y}',$$

where DQ is the dispatch quantity and OQ is the order quantity. Although a general EWMA equation is used in the illustrated example, it is contemplated that a recursive EWMA may also be used.

The dispatch quantity may be related to singulated devices or semiconductor wafers. If the yield is based on the percentage of singulated die that yield in the particular OPN, the dispatch quantity may be specified as the number of singulated die to dispatch. If the yield is based on the percentage of die that yield in the particular OPN from wafers provided to the TMP line 130, the dispatch quantity may be specified as the number of wafers to dispatch. As the required quantity is expressed in terms of devices, the dispatch quantity may be scaled based on the number of die per wafer, $D_w$, to determine the number of wafers to be dispatched:

$$DQ_w = OQ/D_w/\hat{y}'.$$

The dispatch quantity may be spread over one or more time periods depending on the interval between the placing of the order and the fulfillment of the order. Over the course of the production to fill an order, the dispatch quantity may be adjusted. For example, if multiple time periods are available to fulfill an order, the yield monitor 150 may divide the determined dispatch quantity by the number of time periods and dispatch the partial amount of devices to the TMP line 130 for the current time period. After each time periods, the yield monitor 150 may recompute another dispatch quantity based on an updated yield estimate and the remaining quantity. Hence, if the earlier time periods yield a higher than expected number of devices matching the OPN, smaller amounts may be dispatched for the subsequent time periods. Conversely, if earlier time periods fail to yield the expected number of devices, the dispatch quantities may be increased for subsequent time periods.

The yield monitor 150 may determine dispatch quantities for multiple devices and differing OPNs in parallel. In some cases, the dispatch quantities may overlap. For example, if orders exist for the same base device with differing speed grades (i.e., specified by differing OPNs), the dispatch quantities may be combined. The yield monitor 150 determines an overall dispatch quantity needed to fill both orders, which would likely be less than the sum of the two individual dispatch quantities as the same group of dispatched devices would likely yield some devices for each OPN, as may be determined by the yield monitor 150 using the yield histories and resulting estimates.

Figure 3:
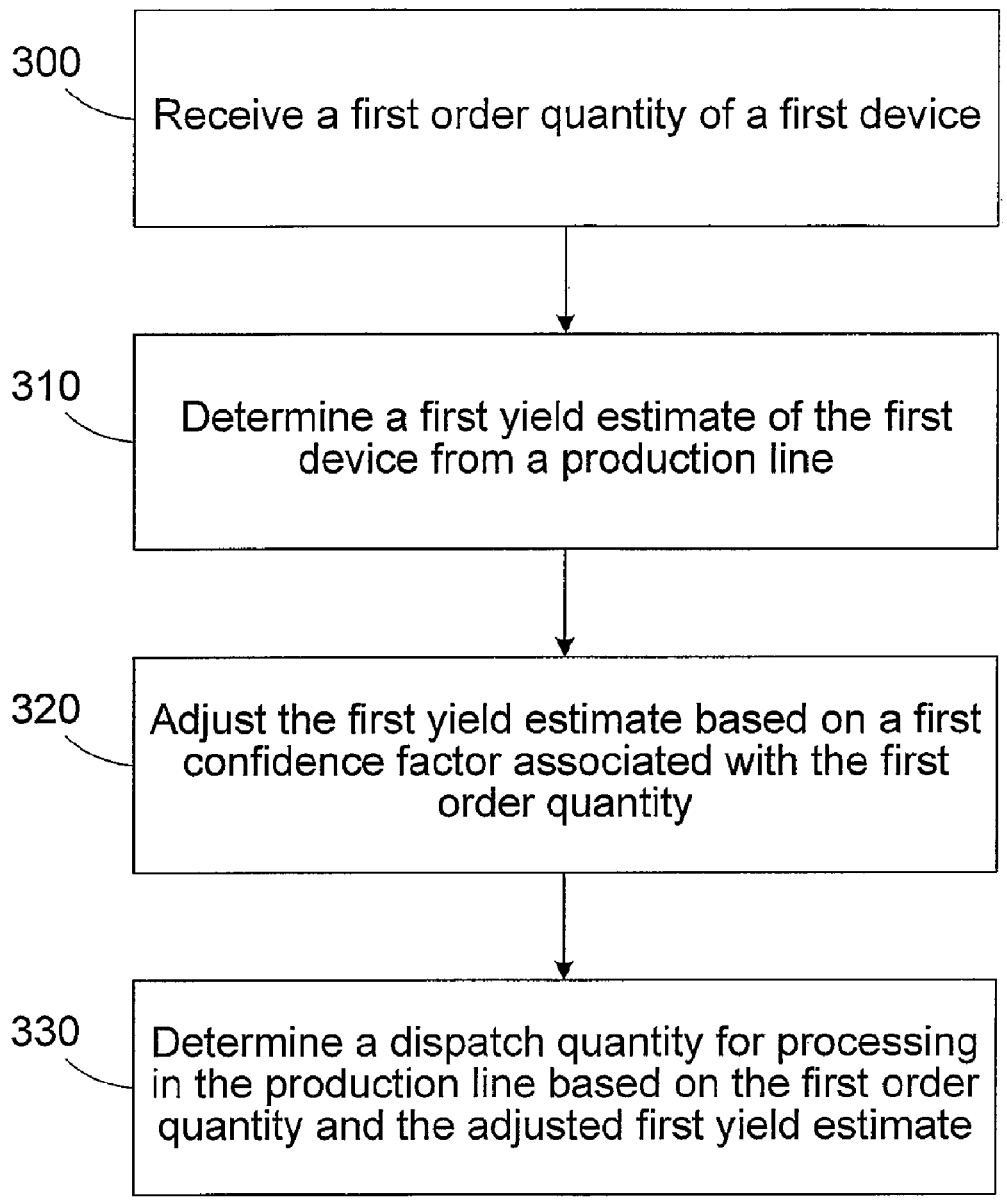
FIG. 3 is a simplified flow diagram of a method for production planning in accordance with another illustrative embodiment of the present invention.

Turning now to FIG. 3, a simplified flow diagram of a method for back-end production planning is provided. In method block 300, a first order quantity of a first device is received. In method block 310, a first yield estimate of the first device from a production line is determined. In method block 320, the first yield estimate is adjusted based on a first confidence factor associated with the first order quantity. In method block 330, a dispatch quantity for processing in the production line is determined based on the first order quantity and the adjusted first yield estimate.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

I claim:

1. A method for production planning, comprising:
receiving a first order quantity of a first device;
determining a first yield estimate of the first device from a production line;
adjusting the first yield estimate based on a first confidence factor associated with the first order quantity; and
determining a dispatch quantity for processing in the production line based on the first order quantity and the adjusted first yield estimate.

2. The method of claim 1, wherein determining the first yield estimate further comprises determining a weighted average of a sample of previous yields of the production line for the first device associated with previous time intervals.

3. The method of claim 2, wherein determining the weighted average further comprises determining an exponentially weighted moving average.

4. The method of claim 1, wherein the first confidence factor comprises a confidence interval associated with an order for the first device, and adjusting the first yield estimate further comprises adjusting the first yield estimate based on the confidence interval and a standard deviation associated with a sample of previous yields of the production line for the first device associated with previous time intervals.

5. The method of claim 1, further comprising:
receiving a second order quantity of a second device;
determining a second yield estimate of the second device from the production line;
adjusting the second yield estimate based on a second confidence factor associated with the second order quantity; and
determining the dispatch quantity for processing in the production line based on the first and second order quantities and the associated first and second adjusted yield estimates.

6. The method of claim 1, wherein determining the dispatch quantity further comprises:
determining a first partial dispatch quantity for a first time interval;
updating the first yield estimate and the adjusted first yield estimate after the first time interval; and
determining a second dispatch quantity for processing in the production line in at least a second time interval based on a remaining order quantity and the updated adjusted first yield estimate.

7. The method of claim 1, wherein the device comprises a semiconductor device, and the method further comprises dispatching wafers including semiconductor die to the production line based on the dispatch quantity.

8. The method of claim 1, further comprising processing devices dispatched based on the dispatch quantity in the production line.

9. A method for production planning, comprising:
receiving a first order specifying a first order quantity of a first device and a first confidence interval associated with the first order;
determining a first yield estimate of the first device from a production line using a weighted average of a sample of previous yields of the production line for the first device during previous time intervals;
adjusting the first yield estimate based on the first confidence interval; and
determining a dispatch quantity for processing in the production line based on the first order quantity and the adjusted first yield estimate.

10. The method of claim 9, wherein the weighted average further comprises an exponentially weighted moving average.

11. The method of claim 9, wherein adjusting the first yield estimate further comprises adjusting the first yield estimate based on the confidence interval and a standard deviation associated with the sample of previous yields.

12. The method of claim 9, wherein the device comprises a semiconductor device, and the method further comprises dispatching wafers including semiconductor die to the production line based on the dispatch quantity.

13. The method of claim 9, further comprising processing devices dispatched based on the dispatch quantity in the production line.

14. A system, comprising:
a production line operable to produce devices; and
a yield monitor operable to receive a first order quantity of a first device, determine a first yield estimate of the first device from the production line, adjust the first yield estimate based on a first confidence factor associated with the first order quantity, and determine a dispatch quantity for processing in the production line based on the first order quantity and the adjusted first yield estimate.

15. The system of claim 14, wherein the yield monitor is further operable to determine the first yield estimate using a weighted average of a sample of previous yields of the production line for the first device associated with previous time intervals.

16. The system of claim 15, wherein the weighted average further comprises an exponentially weighted moving average.

17. The system of claim 14, wherein the first confidence factor comprises a confidence interval associated with an order for the first device, and the yield monitor is further operable to adjust the first yield estimate based on the confidence interval and a standard deviation associated with a sample of previous yields of the production line for the first device associated with previous time intervals.

18. The system of claim 14, wherein the yield monitor is further operable to receive a second order quantity of a second device, determine a second yield estimate of the second device from the production line, adjust the second yield estimate based on a second confidence factor associated with the second order quantity, and determine the dispatch quantity for processing in the production line based on the first and second order quantities and the associated first and second adjusted yield estimates.

19. The system of claim 14, wherein the yield monitor is further operable to determine a first partial dispatch quantity for a first time interval, update the first yield estimate and the adjusted first yield estimate after the first time interval, and determine a second dispatch quantity for processing in the production line in at least a second time interval based on a remaining order quantity and the updated adjusted first yield estimate.

20. The system of claim 14, wherein the device comprises a semiconductor device, and the dispatch quantity specifies a number of semiconductor wafers to dispatch to the production line.

21. A system for production planning, comprising:
means for receiving a first order quantity of a first device;
means for determining a first yield estimate of the first device from a production line;
means for adjusting the first yield estimate based on a first confidence factor associated with the first order quantity; and
means for determining a dispatch quantity for processing in the production line based on the first order quantity and the adjusted first yield estimate.

* * * * *